(12) United States Patent
Saotome et al.

(10) Patent No.: US 7,243,269 B2
(45) Date of Patent: Jul. 10, 2007

(54) ELECTRONIC DEVICE

(75) Inventors: Makoto Saotome, Kawasaki (JP); Takayuki Hatanaka, Atsugi (JP)

(73) Assignee: Fujitsu Limited, Kawasaki (JP)

( * ) Notice: Subject to any disclaimer, the term of this patent is extended or adjusted under 35 U.S.C. 154(b) by 481 days.

(21) Appl. No.: 10/601,663

(22) Filed: Jun. 24, 2003

(65) Prior Publication Data
US 2004/0153856 A1 Aug. 5, 2004

(30) Foreign Application Priority Data
Jun. 28, 2002 (JP) ............................. 2002-190558

(51) Int. Cl.
*G06F 11/00* (2006.01)
(52) U.S. Cl. .............................. 714/44; 714/30; 714/43
(58) Field of Classification Search .................. 714/30, 714/43, 44
See application file for complete search history.

(56) References Cited

U.S. PATENT DOCUMENTS 6,732,301 B1 * 5/2004 Landry et al. ................. 714/43
6,829,726 B1 * 12/2004 Korhonen ..................... 714/25

* cited by examiner

*Primary Examiner*—Robert Beausoliel
*Assistant Examiner*—Charles Ehne
(74) *Attorney, Agent, or Firm*—Westerman, Hattori, Daniels & Adrian, LLP.

(57) ABSTRACT

There is provided an electronic device capable of device testing by using inexpensive testing devices. The electronic device is comprised of a receiver for receiving signals from a shield line and able to be connected by a serial bus including data lines D+ and D−, and the shield line, and an identification unit connected with the receiver for identifying the received signals, and a testing controller for performing self-tests based on the identification results.

10 Claims, 12 Drawing Sheets

FIG.7

| state of switch | testing command signal | state of register | test mode |
|---|---|---|---|
| SW1 SW2 SW3<br>ON OFF OFF | 1V | MSB LSB<br>0  1 | test1 |
| OFF ON OFF | 2V | 1  0 | test2 |
| OFF OFF ON | 3V | 1  1 | test3 |
| OFF OFF OFF | 0V | 0  0 | no test |

ELECTRONIC DEVICE

BACKGROUND OF THE INVENTION

1. Field of the Invention

The present invention relates to an electronic device, more specifically, to a peripheral device such as a storage device connected to a computer, a communication device, or a memory card reader, capable of a self-test by using a simple testing device.

2. Description of the Related Art

Recently, along with the great progress in semiconductor integrated circuits, the increasingly lowered prices thereof, and the increased speed of communication by the Internet, personal computers (PCs) have become widely used, and the peripheral devices connected to PCs such as storage devices, communication devices and so on are in a larger and larger variety.

Various kinds of interfaces are used to connect the peripheral devices with PCs. In particular, the Universal Serial Bus (USB) and the IEEE 1394 are being used nearly as standards for such kind of interfaces, the former being mainly used recently as an interface for data transmission, and the latter being used for moving pictures or other kinds of image data. Furthermore, a drastically increasing number of the peripheral devices are being shipped which are equipped with USB or IEEE 1394 as standard configurations.

FIG. 1 is a schematic view of a usual configuration of a peripheral device equipped with a USB interface (hereinafter, referred to as "USB device"). The USB device 100 is connected to a PC 101 through a USB cable 102 that is on the basis of the USB interface.

A USB device controller 105 receives commands from applications executed in a CPU 103 of the PC 101 through a USB host controller 104 and a USB cable 102, and thereby the CPU 106 of the USB device 100 operates in response to the commands. These commands are transferred in packets, which packet is the minimum transfer unit, or in combinations of packets. A packet consists of a synchronization pattern, a packet ID, and commands. As the modulation scheme, NRZI (Non return to Zero Inverted) is used.

FIG. 2 shows a configuration of a USB cable. In the case of the full speed (transfer speed: 12 Mbps) of the USB 1.1 standard, and the case of the USB 2.0 standard (transfer speed: 480 Mbps), the USB cable 102 is comprised of signal lines D+, D−, a ground line GND, a +5V-power-line Vb, and a shield line 107 covering all the above lines. Here, the two signal lines D+ and D− form a pair and transfer commands or data by differential methods. The +5V-power-line Vb supplies electric power to the USB device 100 from the host side, such as PC 101. The shield line 107 shields the USB cable from static electricity and electromagnetic waves, and is connected to the ground line GND on the side of the PC 101, and is floated from the ground line GND on the side of the USB device 100.

Turning to the problem to be solved by the present invention, although the USB interface has advanced functions such as Plug & Play, in order to control the USB device 100, commands have to be created from the packets described above, and this makes necessary the USB host controller 104 and the PC 101 for controlling the USB host controller 104. Accordingly, PCs are indispensable when checking USB devices or at service stations for maintenance, and this makes the cost for checking higher, and thus increases manufacturing cost.

SUMMARY OF THE INVENTION

Accordingly, it is a general object of the present invention to solve one or more problems of the related art.

A more specific object of the present invention is to provide an electronic device capable of device testing by using inexpensive testing devices.

To attain the above object, according to a first aspect of the present invention, there is provided an electronic device configured to be connected by a serial bus including a signal line and a shield line, comprising a signal receiving unit configured to receive signals from the shield line, and an identification unit connected to the signal receiving unit and configured to identify the received signals, wherein a self-test is performed based on results of the identification.

According to the first aspect of the present invention, the electronic device receives signals from the shield line, identifies the signals, and carries out a self-test. Since the shield line is not used for transferring signals in data transmission, simple signals can be used as the commands of self-tests, and simple circuits can be used for identifying the received signals. As a result, device testing can be done by using inexpensive testing devices, and the electronic device of the above invention can be tested by just adding the inexpensive testing circuits.

Preferably, the signals from the shield line include one of direct-current voltage signals, tone signals, and digital signals.

To attain the above object, according to a second aspect of the present invention, there is provided an electronic device configured to be connected by a serial bus including a signal line, comprising a signal receiving unit configured to receive signals off a standard for the serial bus from the signal line, and an identification unit connected to the signal receiving unit and configured to identify the received signals, wherein a self-test is performed based on results of the identification.

According to the second aspect of the present invention, signals off the serial bus standard are used for self-tests, and are received by the electronic device via the signal line. Because the signals off the serial bus standard are simple, simple circuits can be used to identify the received signals. As a result, device testing can be done by using inexpensive testing devices, and the electronic device of the above invention can be tested by just adding inexpensive circuits.

Preferably, the signals off the serial bus standard include one of signals having voltages exceeding the serial bus standard, signals different in transmission speed from the serial bus standard, and signals different in protocol from the serial bus standard.

These and other objects, features, and advantages of the present invention will become more apparent from the following detailed description of the preferred embodiments given with reference to the accompanying drawings.

BRIEF DESCRIPTION OF THE DRAWINGS

FIG. 7 is a view showing the relation between inputs of a switch SW and test modes;

DESCRIPTION OF THE PREFERRED EMBODIMENTS

Below, preferred embodiments of the present invention will be explained with reference to the accompanying drawings.

First Embodiment

Figure 1:
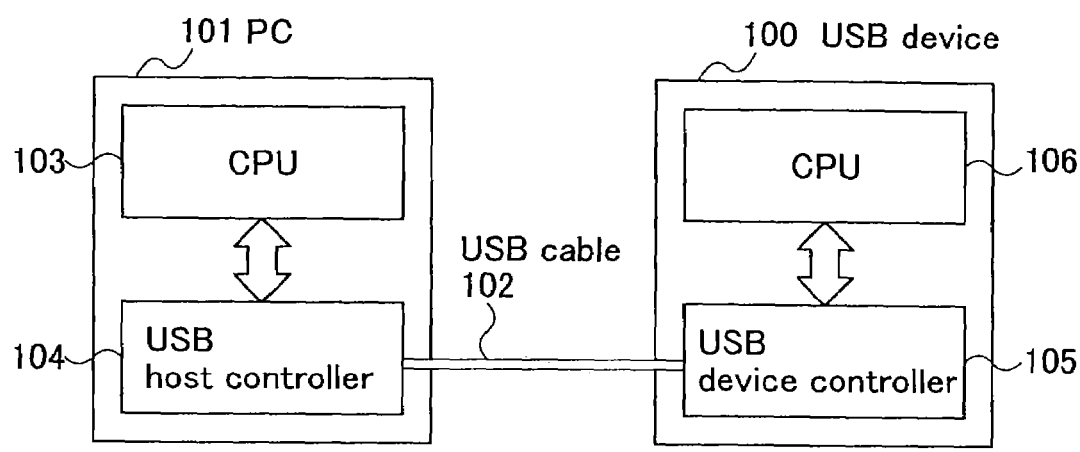
FIG. 1 is a schematic view of a usual configuration of a USB device.
Figure 2:
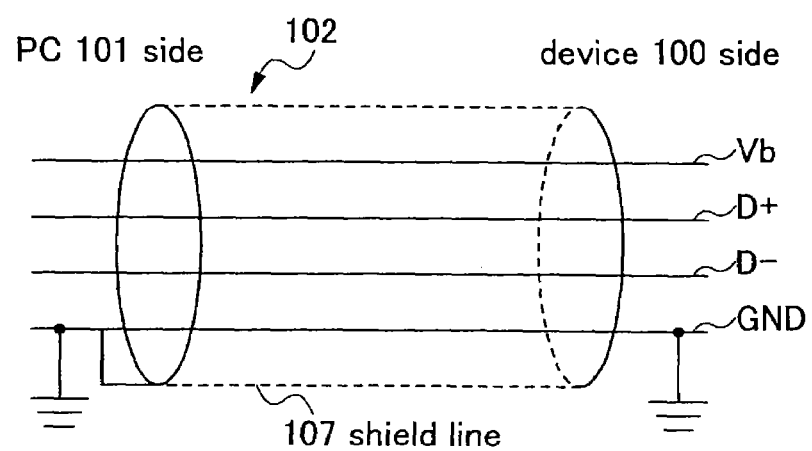
FIG. 2 is a view showing a configuration of a USB cable.
Figure 3:
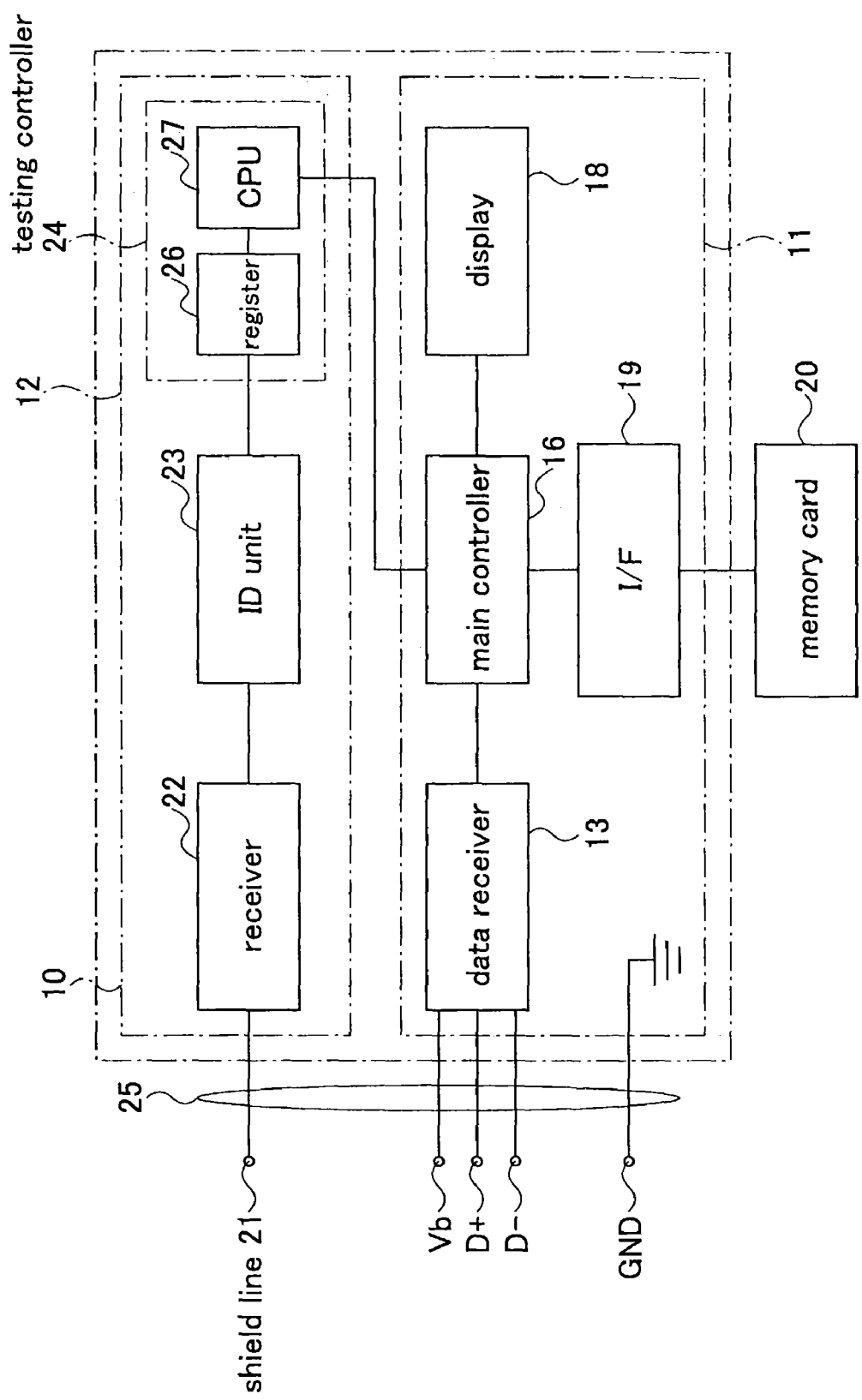
FIG. 3 is a block diagram of a configuration of an electronic device according to a first embodiment of the present invention.

FIG. 3 is a block diagram of a configuration of a USB device related to the first embodiment of the electronic device according to the present invention.

Referring to FIG. 3, the USB device 10 is comprised of a main circuit 11 for receiving command signals from a host and executing data transmission or other various basic functions of the USB device 10, and a testing circuit 12 for receiving test command signals from the outside, identifying the test command signals and conducting self-tests.

The main circuit 11 provides various basic functions of the USB device 10, and includes a data receiver 13 connected with a data line D+, a data line D−, a 5V-power line Vb, and a ground line GND of a USB interface, a main controller 16 comprising a controller for controlling communications with a PC or other hosts via the data lines D+ and D− in accordance with the USB interface standard and a CPU for operating the main circuit 11 in response to the received commands, a display 18 for showing the operation conditions of the USB device 10, and an I/F unit 19 for inputting data from and outputting data to a memory card 20 connected with the USB device 10. Note that the connector 25 of the data receiver 13, which is connected with outside terminals such as the data lines D+, D−, also serves as the later-shown connector of the receiver 22 of the testing circuit 12.

The testing circuit 12 includes a receiver 22 connected with a shield 21 of the USB interface, an identification unit 23 (indicated by "ID unit" in FIG. 3) for identifying commands based on test command signals received by the receiver 22, and a testing controller 24 that determines a test mode based on a signal for specifying a type of the test received from the identification unit 23 and directs the main circuit 11 to perform a test.

The receiver 22 is mounted with a USB connector 25, for example, a USB receptacle or a USB plug. The shield 21 of the connector 25 (hereinafter, referred to as "shield line") is connected with the receiver 22. Further, its ground line GND is connected with the ground line GND of the receiver 22.

According to the USB standard, the USB shield line 21 is floated, not being connected with the ground line GND on the side of the USB device, that is, the USB shield line 21 is idle according to the USB standard. In the present invention, the USB shield line 21 is used for receiving test command signals.

The identification unit 23 converts the signals from the receiver 22 to digital ones according to the signal types by using a comparator, an AD converter, a PLL (Phase Locked Loop) circuit, or a UART (Universal Asynchronous Receiver Transmitter) circuit.

The testing controller 24 retains the digital data converted in the identification unit 23 in the registers 26, and a CPU 27 of the testing controller 24 carries out one kind, or kinds of tests. Here, the so-called "test" includes, for example, checking data in an inner memory of a CPU of the main controller 16, checking operation of the I/F unit 19, and checking operation of the memory card 20 connected to the USB device 10.

Figure 4:
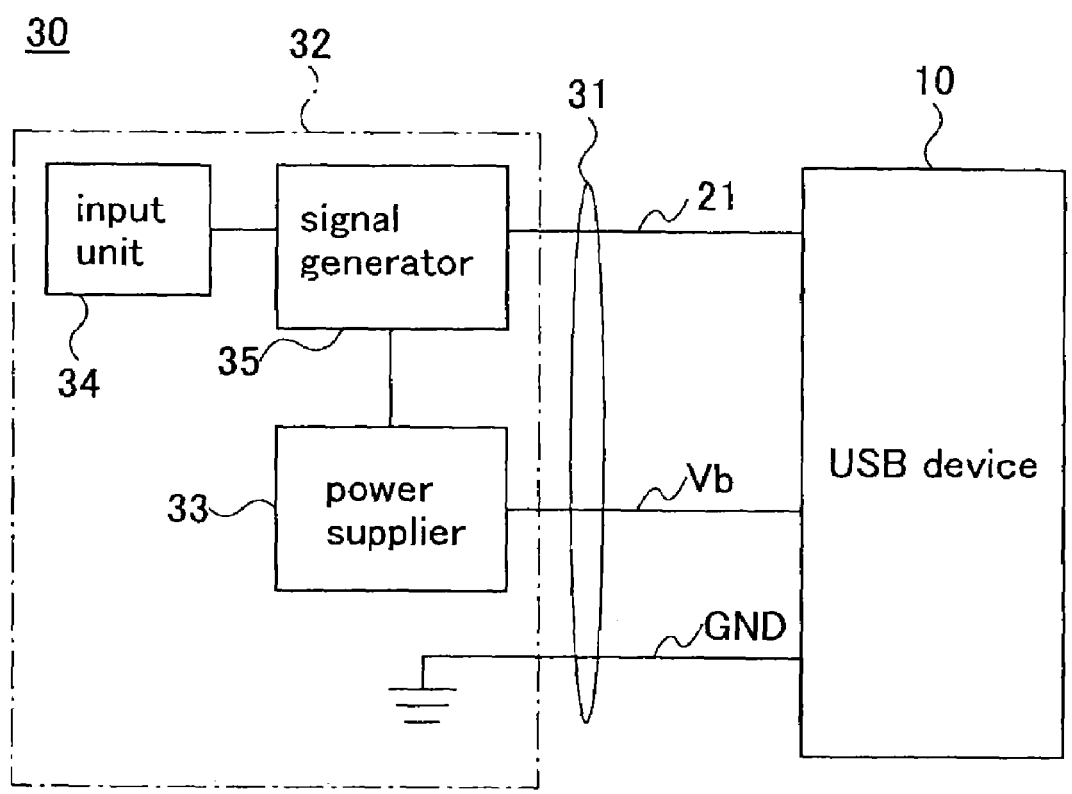
FIG. 4 is a block diagram of a configuration of a testing system for self-tests of the USB device according to the first embodiment of the present invention.

FIG. 4 is a block diagram showing a configuration of a testing system for self-tests of the USB device 10.

Referring to FIG. 4, the testing system 30 includes the aforesaid USB device 10, a testing device 32 sending test command signals, and a USB cable 31 connecting the USB device 10 and the testing device 32.

The testing device 32 is comprised of a power supplier 33 for supplying electric power to the USB device 10, an input unit 34 comprising a plurality of push switches, and a signal generator 35 for generating and transmitting test command signals according to the selected switch.

The power supplier 33, for example, is implemented as a switching power supplier, supplying a +5V power voltage to the USB device 10 through the USB cable, and electric power to drive the signal generator 35.

The input unit 34, for example, is provided with a toggle switch, or push switches, or other means facilitating selection of a test mode. After selecting a switch, the signal generator 35 generates signals corresponding to the position of the selected switch.

The signal generator 35, for example, is able to generate any one of DC voltage signals, tone signals, and digital signals. For example, it is comprised of a variable voltage applying circuit, or a sinusoidal signal generating circuit, or a digital signal generating circuit, or others. The output terminal of the signal generating circuit 35 is connected with the shield line 21, and the test command signal generated here is transmitted by the shield line 21 to the receiver 22 of the USB device 10 as shown in FIG. 3.

Next, operation of the above testing system is explained with reference to FIG. 5.

Figure 5:
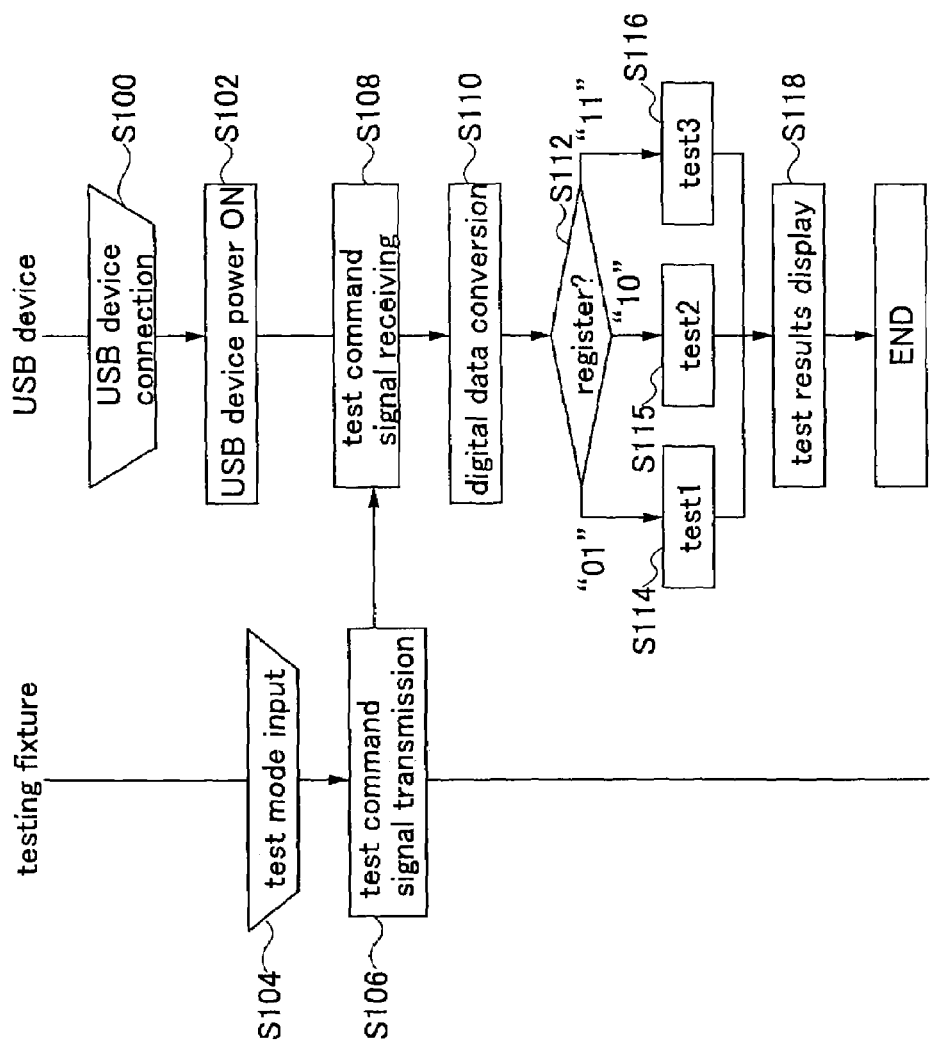
FIG. 5 is a flow chart for explaining operation of the testing system.

FIG. 5 is a flow chart explaining operation of the testing system shown in FIG. 4.

In step S100, the USB device 10 is connected to the testing device 32.

In step S102, a power voltage of +5V is supplied to the USB device 10.

In step S104, a test mode is input at the input unit 34 of the testing device 32.

In step S106, a test command signal is generated in the signal generator 35 in response to the inputted test mode.

In step S108, the test command signal is transmitted through the shield line 21 of the USB cable 31, and is received by the receiver 22 of the USB device 10.

In step S110, the test command signal is converted into parallel digital data in the identification unit 23, and is retained in the register 26 of the testing controller 24.

In step S112, for example, the CPU 27 of the testing controller 24 determines the test mode according to the data stored in the register 26. For example, if the data in the register 26 are "01" as shown in step S114, the CPU 27 of the testing controller 24 carries out a test selected from test 1 through test 3 to test programs stored in a ROM.

In step S118, results of test 1 are shown in the display 18, and then the test is finished.

If it is desired to continue the test, the test mode should be input again to the input unit 34 of the testing device 32, as done in step S104.

According to the present embodiment, the USB device 10 receives the test command signals through the shield line 21, and the test command signals are simple signals such as DC voltage signals, tone signals, or digital signals, so simple and inexpensive circuits can be used to configure the identification unit 23. Further, the testing device 32 does not need to include a PC, thus can also be configured by using inexpensive devices. Accordingly, device testing can be done by using inexpensive testing devices, and the electronic device of the present embodiment can be tested by just adding inexpensive circuits.

Next, examples of the present embodiment are presented especially for detailed explanations of the test command signals, the identification unit 23, and the testing device 32 connected with the USB device 10.

EXAMPLE 1

This example relates to a USB device wherein the test command signals are DC voltage signals each having a different level.

Figure 6:
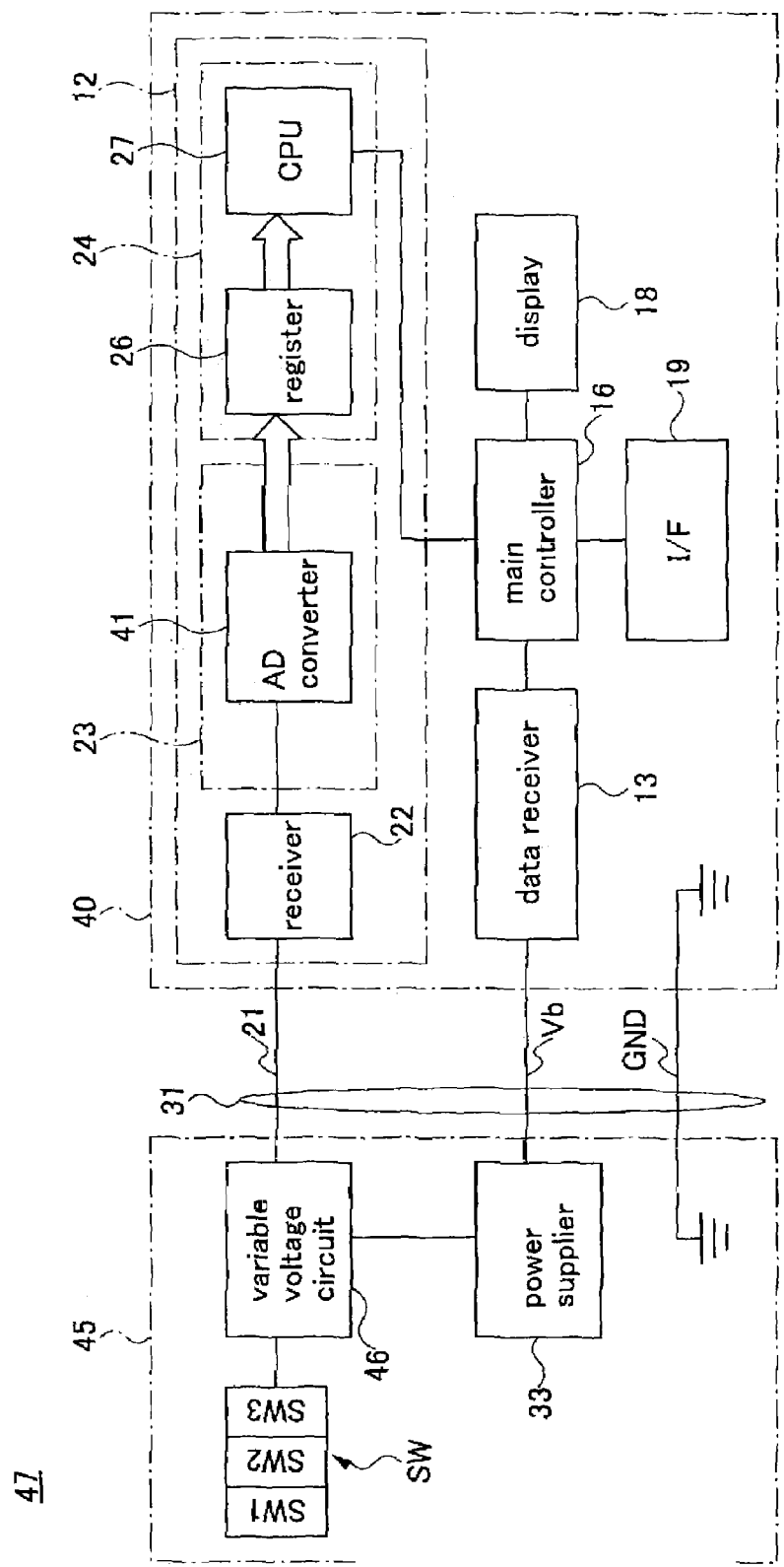
FIG. 6 is a block diagram of a first example of a configuration of the testing system for self-tests according to the first embodiment of the present invention, wherein a USB device is connected with a testing device.

FIG. 6 is a block diagram showing a configuration of a testing system for self-tests, wherein a USB device is connected with a testing device. Note that the same numeral references are assigned to the same parts as those already described, and explanations thereof are omitted.

Referring to FIG. 6, the testing system 47 comprises a USB device 40, a testing device 45, and a USB cable 31 connecting them. An AD converter 41 is used as the identification unit 23 of the USB device 40, and a variable voltage circuit 46 is used as the signal generator 35 of the testing device 45.

The variable voltage circuit 46, for example, is comprised of a circuit for dividing the power voltage by resistors. If one of the three switches SW 1 through 3 is switched ON, a voltage corresponding to a specific test mode is selected. For example, if there are three test modes test 1, test 2, and test 3, DC voltages of 1V, 2V, and 3V are assigned to these three modes, respectively.

The selected DC voltage signal, which functions as the test command signal, is transmitted through the shield line 21 of the USB cable 31, received in the receiver 22 of the USB device 40, and is input to the AD converter 41. According to the voltage of the test command signal, the AD converter 41 outputs two bits parallel data to the register 26 of the testing controller 24. The data are latched in the register 26, and the CPU 27 of the testing controller 24 performs testing in response to the data.

FIG. 7 shows the relation between the inputs of the switches SW 1 through 3 and the test mode. Specifically, shown in FIG. 7 is the relation between the inputs of the switches SW 1 through 3, the test command signals of the variable voltage circuit 51, and the register 26 and the test modes. As shown in FIG. 7, when all of the switches SW 1 through 3 are set OFF, testing is not performed, and when one of the switches SW 1 through 3 is set ON, test command signals corresponding to the switch are generated, and a test in response to the test command signals is executed.

According to the above example, since DC voltage signals transmitted through the shield line 21 are used as the test command signals, a simple testing circuit 12 can be configured by using the AD converter 41, and the testing device 45 can also be configured by using a simple circuit such as the variable voltage circuit 46. Accordingly, device testing can be done by using inexpensive testing devices, and the electronic device of the present embodiment can be tested by just adding inexpensive circuits.

EXAMPLE 2

This example relates to a USB device wherein the test command signal is a sinusoidal signal having a plurality of frequencies.

Figure 8:
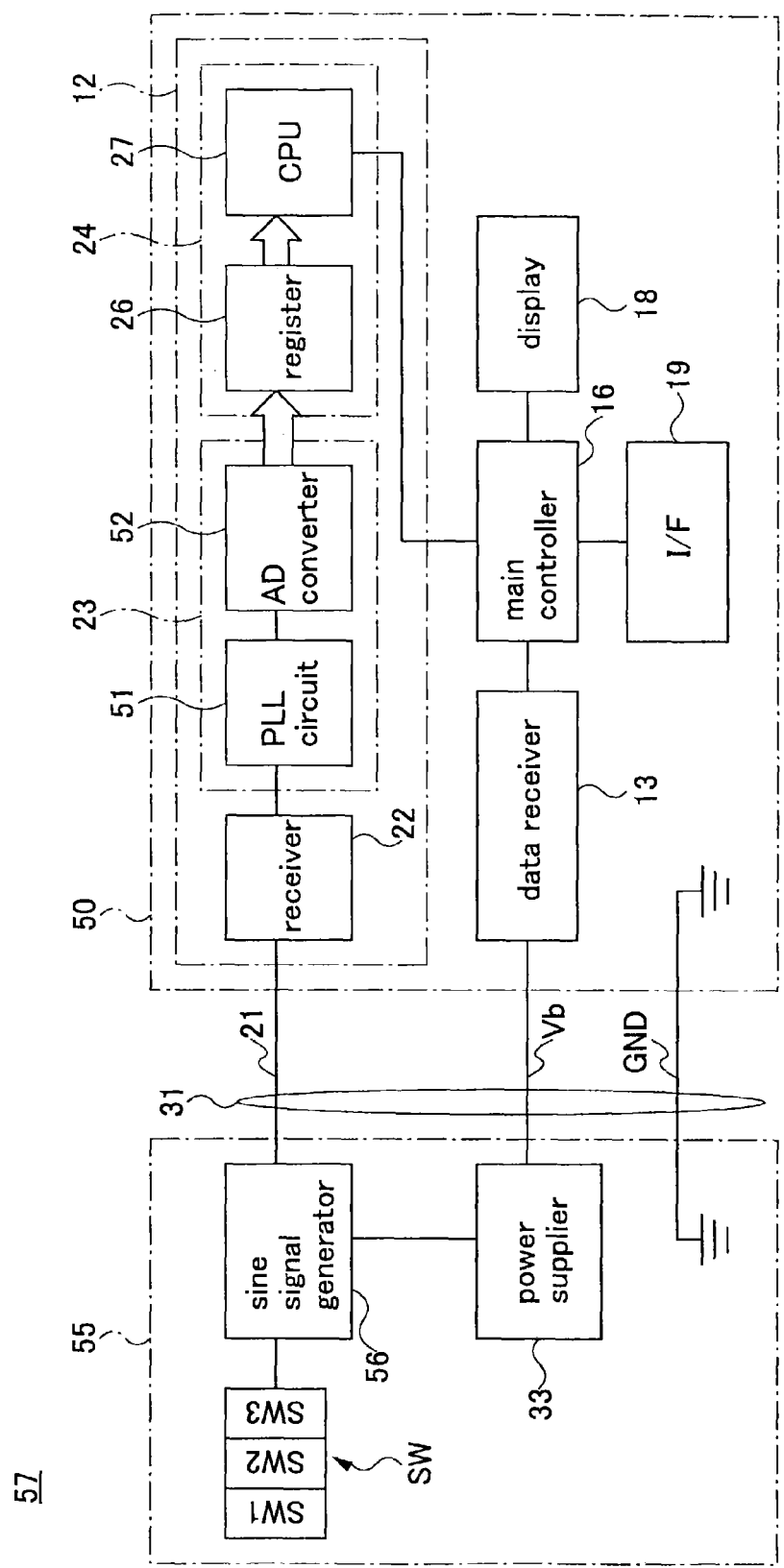
FIG. 8 is a block diagram of a second example of a configuration of a testing system according to the first embodiment of the present invention, wherein a USB device is connected with a testing device.

FIG. 8 is a block diagram showing a configuration of a testing system for self-tests, wherein a USB device is connected with a testing device.

Referring to FIG. 8, the testing system 57 comprises a USB device 50, a testing device 55, and a USB cable 31 connecting them. A PLL circuit 51 and an AD converter 52 are used as the identification unit 23 of the USB device 50, and a sinusoidal signal generator 56 is used as the signal generator 33 of the testing device 55 to generate test command signals.

The sinusoidal signal generator 56, for example, includes a Wien bridge oscillation circuit. For example, if one of the three switches SW provided in the testing device 55 is switched ON, a frequency corresponding to a specific test mode is selected. For example, if there are three test modes test 1, test 2, and test 3, frequencies of 1 kHz, 2 kHz, and 3 kHz are assigned to them, respectively.

The selected sinusoidal test command signal is transmitted through the shield line 21 of the USB cable 31, received in the receiver 22 of the USB device 50, and is input to the PLL circuit 51.

The PLL circuit 51 outputs a DC voltage proportional to the difference between the oscillation frequency of a voltage control oscillation circuit constituting the PLL circuit 51, and the oscillation frequency of the test command signal. The maximum of the output is converted to digital data by the AD converter 52 and two bit parallel data are output to the register 26 of the testing controller 24. The data are latched in the register 26, and the CPU 27 of the testing controller 24 performs testing in response to the data. Concerning the relation between ON/OFF state of the switches and the test mode, it is the same as that shown in FIG. 7 except that the test command signals are different.

According to the above example, since sinusoidal signals transmitted through the shield line 21 are used as the test command signals, a simple testing circuit 12 can be configured by using the PLL circuit 51 and the AD converter 52, and the testing device 55 can also be configured by using a simple circuit such as the sinusoidal oscillation circuit 56. Accordingly, device testing can be done by using inexpensive testing devices, and the electronic device of the present embodiment can be tested by just adding inexpensive circuits.

Note that in the identification unit 23, a frequency-voltage converting (F/V conversion) circuit can also be utilized instead of the PLL circuit 51.

EXAMPLE 3

This example relates to a USB device wherein the test command signal is a digital signal having a plurality of frequencies.

Figure 9:
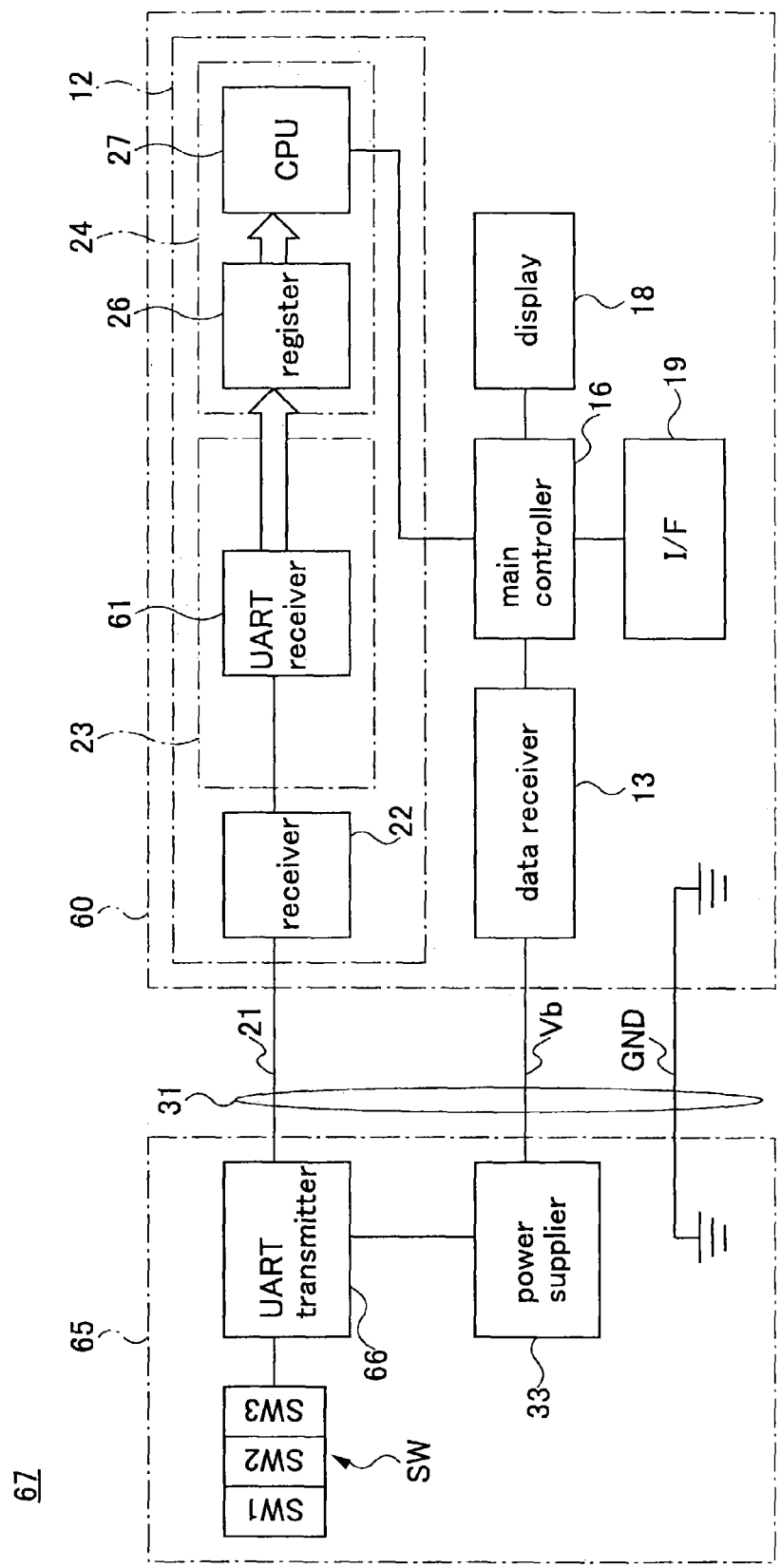
FIG. 9 is a block diagram of a third example of a configuration of a testing system according to the first embodiment of the present invention, wherein a USB device is connected with a testing device.

FIG. 9 is a block diagram showing a configuration of a testing system for self-tests, wherein a USB device is connected with a testing device.

Referring to FIG. 9, the testing system 67 comprises a USB device 60, a testing device 65, and a USB cable 31 connecting them. A UART receiver 61 is used as the identification unit 23 of the USB device 60, and a UART transmitter 66 is used as the signal generator 33 of the testing device 65 to generate test command signals. This example is the same as the second example except for usage of a serial digital data signal as the test command signal, usage of the UART transmitter 66, and usage of the UART receiver 61 as the identification unit 23.

The UART transmitter 66, for example, uses a circuit able to vary the serial data generated when a switch SW is selected. Such a circuit may be constituted by a TTL logic circuit, or a microcomputer. If the transmission speed of the test command signals is 1 kbps, the serial data signals corresponding to three test modes are set to be eight-bit data "00000000", "11111111", and "01010101", respectively.

The UART receiver 61 converts the input serial data that functions as the test command signal to parallel data, and the test command signal is output to the register 26 of the testing controller 24.

According to the above example, since serial data signals transmitted through the shield line 21 are used as the test command signals, a simple testing circuit 12 can be constituted by using the UART receiver 61, and the testing device 65 can also be configured by using a simple circuit such as the UART transmitter 66. Accordingly, device testing can be done by using inexpensive testing devices, and the electronic device of the present embodiment can be tested by just adding inexpensive circuits.

Second Embodiment

Figure 10:
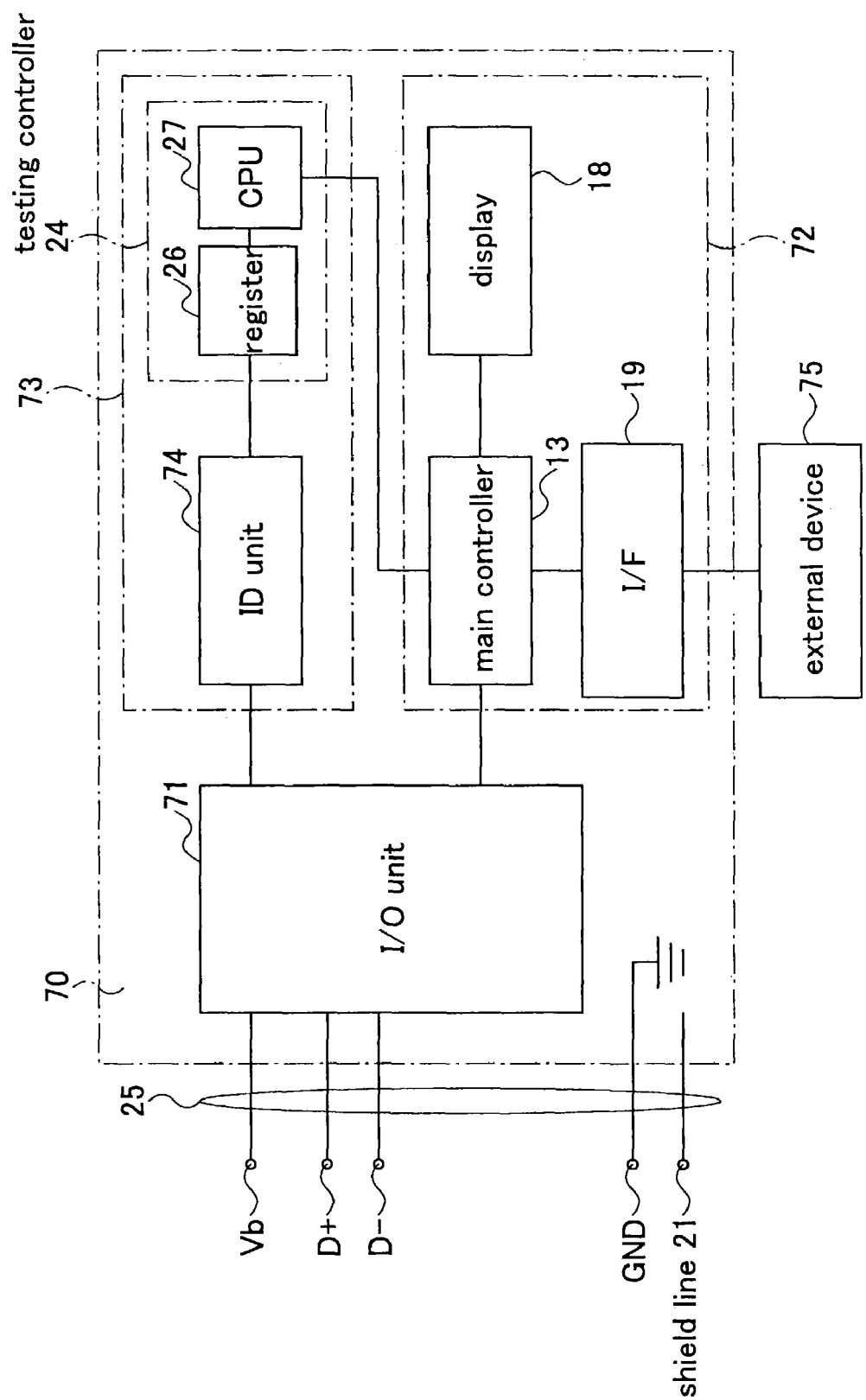
FIG. 10 is a block diagram of a configuration of an electronic device according to a second embodiment of the present invention.

FIG. 10 is a block diagram of a configuration of a USB device related to the second embodiment of the electronic device according to the present invention. In the following embodiment and examples, the same numeral references are assigned to the same parts as those already described, and the explanations thereof are omitted.

Referring to FIG. 10, the USB device 70 is comprised of an I/O unit 71 for inputting data from and outputting data to a host computer connected with the USB device 70 by a USB interface, a main circuit 72 for receiving command signals from the host and executing data transmission or other various basic functions of the USB device 70, and a testing circuit 73 for receiving test command signals from the outside, identifying the test command signals, and conducting self-tests.

The I/O unit 71 is comprised of a USB connector 25 having terminals for connection with the data lines D+, D−, the ground line GND, the +5V-power-line Vb, and the shield line 21, a receiver for converting differential signals received via the data lines D and D− to TTL signals, and outputting them to the main circuit 72 and the testing circuit 73, and a receiving and transmitting circuit for converting the signals from the main circuit 72 to differential signals and transmitting them to the host via the data lines D+ and D−. In accordance with the USB standard, either the data line D+ or the data line D− is pulled up to 3.0 V~3.6 V by a 1.5 kΩ resistor, so this portion is compensated for when converting the received differential signals.

The same as the main circuit 11 in the first embodiment, the main circuit 72 provides various basic functions of the USB device 70. The main circuit 72 is connected to an external electronic device 75 through an I/F device of the USB device 70.

The testing circuit 73 includes an identification unit 74 for identifying test commands signals received by the I/O unit 71, and a testing controller 24 that determines a test mode based on a signal for specifying a type of the test received from the identification unit 74 and instructs the main circuit 72 to perform a test.

The identification unit 74 includes circuits configured in accordance with the test command signals generated by the signal generator 76 of the testing device 75 described later. As shown later, signals off the USB standard are used as the test command signals, and depending on the types of the test command signals, the identification unit 74 may include a pulse detection circuit, a transmission speed comparison circuit, and so on. Using these circuits, the test command signals are converted to parallel digital data, and are output to the testing controller 24.

The testing controller 24 is the same as that of the first embodiment.

Figure 11:
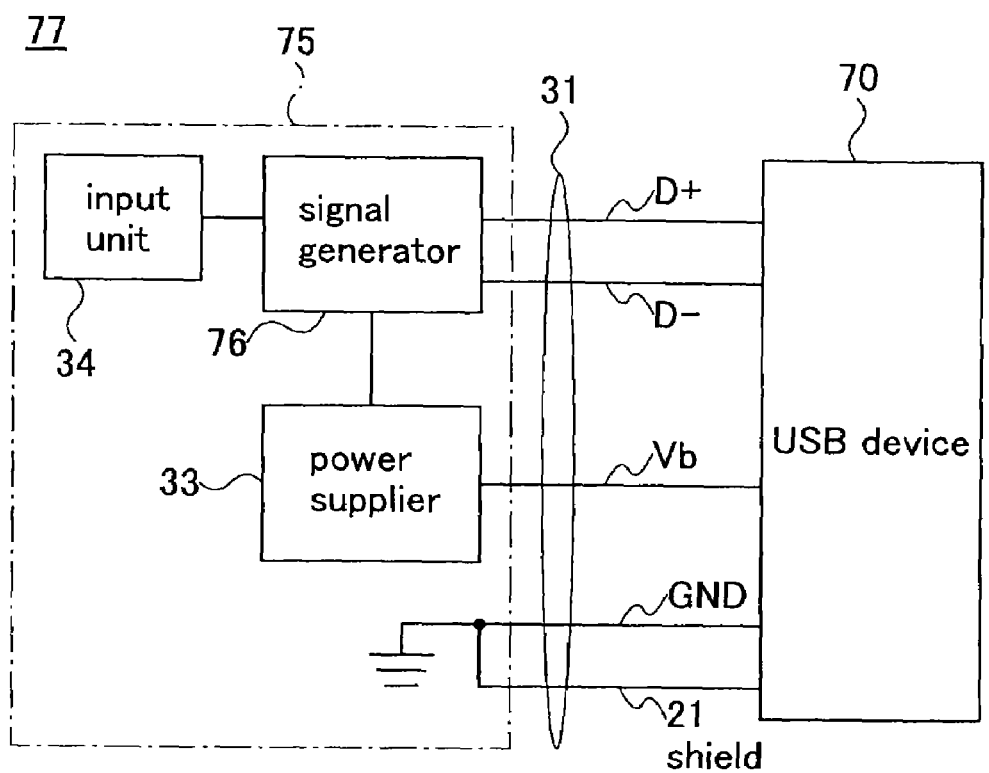
FIG. 11 is a block diagram of a configuration of a testing system for self-tests of the USB device according to the second embodiment of the present invention.

FIG. 11 is a block diagram showing a configuration of a testing system for self-tests of the USB device 70.

Referring to FIG. 11, the testing system 77 includes the aforesaid USB device 70, and a testing device 75 connected with the USB device 70 by a USB cable 31 and sending test command signals to the USB device 70.

The signal generator 76 generates test command signals according to the selection of the input unit 34, and converts them to differential signals, and outputs signals of inverted phases to the data lines D+ and D−. Here, as the test command signal, signals off the USB standard are generated. For example, such kind of signals may include signals having voltages exceeding the serial bus standard, signals different in transmission speed from the serial bus standard, and signals different in protocol from the serial bus standard. In the USB standard, transmission speeds are specified to be 12 Mbps, 15 Mbps, and 480 Mbps for the low speed and full speed of the USB 1.1, and the high speed of the USB 2.0, respectively. Further, as the minimum unit of command signals and data signals, the format of a packet is defined in the USB standard. Further, as the modulation scheme, NRZI (Non Return to Zero Inverted) is used. In the present embodiment, signals deviating from the above specifications are used as the test command signals. For example, use can be made of signals including repeated data "1" in NRZ (Non Return to Zero) having a transmission speed of a few kbps to 10 kbps, or signals of a few bits. Such kind of test command signals can be easily generated by a multivibrator circuit, or by a TTL IC of one-shot or flip-flop.

Operation of the testing system 77 is the same as that explained in FIG. 5.

According to the present embodiment, the USB device 70 receives the test command signals through the data lines D+ and D−, and the test command signals are simple digital signals, so simple and inexpensive circuits can be used to configure the identification unit 74. Further, the testing device 75 does not need to include a PC, and can also be configured by using inexpensive devices having simple signal generators 76. Accordingly, device testing can be done by using inexpensive testing devices, and the electronic device of the present embodiment can be tested by just adding inexpensive circuits.

Examples of the present embodiment are shown below.

EXAMPLE 4

This example relates to a USB device wherein the test command signal includes a pulsed signal of a few bits.

Figure 12:
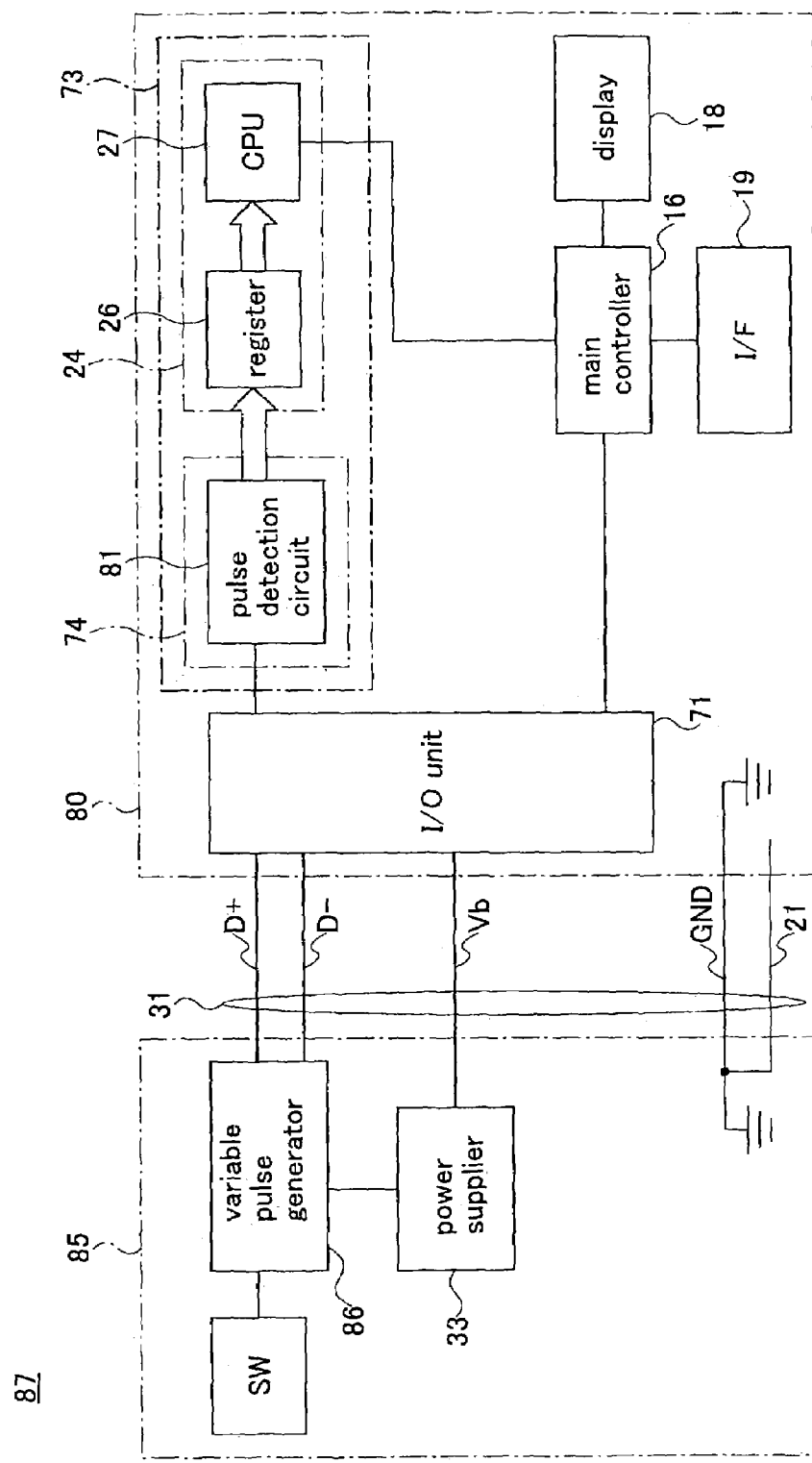
FIG. 12 is a block diagram of a fourth example of a configuration of a testing system for self-tests according to the second embodiment of the present invention, wherein a USB device is connected with a testing device.

FIG. 12 is a block diagram showing a configuration of a testing system for self-tests, wherein a USB device is connected with a testing device.

Referring to FIG. 12, the testing system 87 comprises a USB device 80, a testing device 85, and a USB cable 31 connecting them. A pulse detection circuit 81 is used as the identification unit 74 of the USB device 80, and a variable pulse generator 86 is used as the signal generating circuit of the testing device 85.

The variable pulse generator 86 uses a circuit able to vary the pulse number generated when a switch SW is selected. Such a circuit may be constituted by a TTL logic circuit, or a simple microcomputer.

Assuming the transmission speed of the test command signals is 1 kbps, a value deviating from the aforesaid USB standard, the pulse numbers corresponding to two test modes are set to be two bits and three bits, respectively.

The test command signals are transmitted by the data lines D+ and D− of the USB cable 31, and are converted to TTL signals in the I/O unit 71 of the USB device 80, and are input to the pulse detection circuit 81 of the identification unit 74.

The pulse detection circuit 81 counts pulses only at predetermined pulse intervals, and transmits the resultant parallel digital signals to the register 26 of the testing controller 24. Such a circuit may be constituted by, for example, a TTL logic circuit.

According to the above example, since simple pulse signals out of the USB standard are used as the test command signals, a simple testing circuit 73 can be constituted, and the testing device 85 can also be configured by using a simple circuit such as the variable pulse generator 86. Accordingly, device testing can be done by using inexpensive testing devices, and the electronic device of the present embodiment can be tested by just adding inexpensive circuits.

EXAMPLE 5

This example relates to a USB device wherein the test command signal includes a digital signal having a plurality of frequencies.

Figure 13:
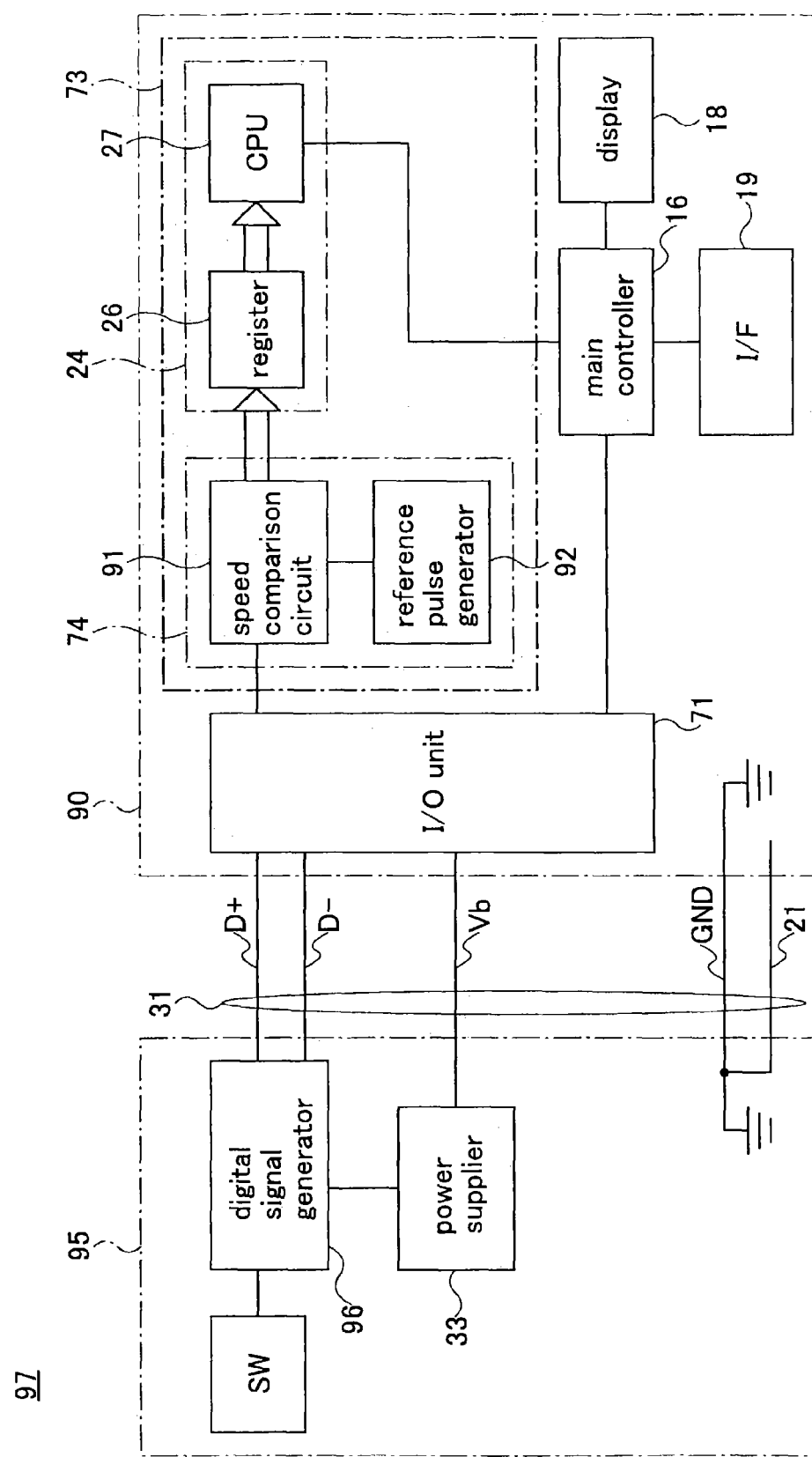
FIG. 13 is a block diagram of a fifth example of a configuration of a testing system for self-tests according to the second embodiment of the present invention, wherein a USB device is connected with a testing device.

FIG. 13 is a block diagram showing a configuration of a testing system for self-tests, wherein a USB device is connected with a testing device.

Referring to FIG. 13, the testing system 97 comprises a USB device 90 and a testing device 95, and a USB cable 31 connecting them. The identification unit 74 of the USB device 90 is comprised of a transmission speed comparison circuit 91 and a reference pulse generator 92. In addition, a digital signal generator 96 is used as the signal generating circuit of the testing device 95.

The digital signal generator 96 uses a circuit able to vary the transmission speed of pulses generated when a switch SW is selected. Such a circuit may be constituted by a multivibrator circuit. The transmission speeds of the test command signals corresponding to two test modes are set to be 10 kbps, and 20 kbps, respectively, which deviate from the aforesaid USB standard, and the NRZ is used as the modulation scheme.

The test command signals are transmitted by the data lines D+ and D− of the USB cable 31, and are converted to TTL signals in the I/O unit 71 of the USB device 90, and are input to the transmission speed comparison circuit 91 of the identification unit 74.

The transmission speed comparison circuit 91 is connected to the reference pulse generator 92. For example, in the reference pulse generator 92, reference signals at 10 kbps and 20 kbps and modulated by NRZ are generated, and in the transmission speed comparison circuit 91, the test command signals are compared with the reference signals. When they are coincident, the test command signals are written to the register 26 according to the transmission speed of the test command signal. The transmission speed comparison circuit 91, for example, can be constituted by PLL circuits and TTL logic circuits.

According to the above example, since digital signals having transmission speeds off the USB standard are used as the test command signals, a simple testing circuit 73 can be constituted, and the testing device 95 can also be configured by using a simple circuit such as a signal generator. Accordingly, device testing can be done by using inexpensive testing devices, and the electronic device of the present embodiment can be tested by just adding inexpensive circuits.

While the invention has been described with reference to specific embodiments chosen for purpose of illustration, it should be apparent that the invention is not limited to these embodiments, but numerous modifications could be made thereto by those skilled in the art without departing from the basic concept and scope of the invention.

For example, the testing controller 24 and the main controller 16 may use the same CPU, and thereby the cost can be lowered further. In addition, the USB device and the testing device may be connected directly by USB connectors, for example, by the USB plug provided in the USB device, and the receptacle provided in the testing device. Furthermore, in the above descriptions, examples of USB devices using USB interfaces are used for explanations, but the present invention is not limited to the USB interface, for example, it is also applicable to USB devices using the IEEE 1394 interface.

Summarizing the effect of the invention, according to the present invention, it is possible to provide an electronic device capable of device testing by using inexpensive testing devices.

This patent application is based on Japanese priority patent application No. 2002-190558 filed on Jun. 28, 2002, the entire contents of which are hereby incorporated by reference.

What is claimed is:

1. An electronic device configured to be connected by a serial bus including a signal line and a shield line, comprising:

a signal receiving unit configured to receive signals from the shield line; and an identification unit connected to the signal receiving unit and configured to identify the received signals, wherein a self-test is performed based on results of the identification.

2. The electronic device as claimed in claim 1, wherein said signals from the shield line include one of direct-current voltage signals, tone signals, and digital signals.

3. The electronic device as claimed in claim 1, wherein the serial bus is a USB.

4. The electronic device as claimed in claim 1, further comprising a display for displaying results of the self-test.

5. An electronic device configured to be connected by a serial bus including a signal line, comprising:
   a signal receiving unit configured to receive signals off a standard for the serial bus from the signal line; and
   an identification unit connected to the signal receiving unit and configured to identify the received signals,
   wherein a self-test is performed based on results of the identification.

6. The electronic device as claimed in claim 5, wherein said signals off the standard for the serial bus include one of signals having voltages exceeding the standard for the serial bus, signals different in transmission speed from the standard for the serial bus standard, and signals different in protocol from the standard for the serial bus standard.

7. The electronic device as claimed in claim 5, wherein the serial bus is a USB.

8. The electronic device as claimed in claim 5, further comprising a display for displaying results of the self-test.

9. A testing device for transmitting test command signals to an electronic device connected with the testing device by a serial bus including a signal line and a shield line, said testing device transmitting the test command signals to the electronic device through the shield line.

10. A testing device for transmitting test command signals to an electronic device connected with the testing device by a serial bus including a signal line, said testing device transmitting signals off a standard of the serial bus as said test command signals to the electronic device through the signal line.

* * * * *